(12) United States Patent  (10) Patent No.: US 8,556,314 B1
Kettell  (45) Date of Patent: Oct. 15, 2013

(54) LOG LIFTING FACILITATING ASSEMBLY

(71) Applicant: Robert K. Kettell, Naperville, IL (US)

(72) Inventor: Robert K. Kettell, Naperville, IL (US)

( * ) Notice: Subject to any disclaimer, the term of this patent is extended or adjusted under 35 U.S.C. 154(b) by 0 days.

(21) Appl. No.: 13/721,205

(22) Filed: Dec. 20, 2012

(51) Int. Cl.
*B65G 7/12* (2006.01)

(52) U.S. Cl.
USPC ................. 294/82.1; 294/26; 294/61

(58) Field of Classification Search
USPC ............ 294/82.1, 26, 61, 5, 14, 15, 120, 142, 294/173; 441/51
See application file for complete search history.

(56) References Cited

U.S. PATENT DOCUMENTS

| | | | | |
|---|---|---|---|---|
| 842,220 A | * | 1/1907 | Martin | 294/82.1 |
| 951,463 A | * | 3/1910 | Spears | 294/82.1 |
| 1,071,983 A | * | 9/1913 | Byrn | 294/82.1 |
| 1,207,367 A | * | 12/1916 | Buswell | 140/117 |
| 1,548,209 A | * | 8/1925 | Rounds | 294/82.1 |
| 1,621,030 A | * | 3/1927 | Salisbury | 294/82.1 |
| 1,710,575 A | | 4/1929 | Grant | |
| 2,138,489 A | * | 11/1938 | Gilkey | 441/51 |
| 3,310,331 A | | 3/1967 | Michaud | |
| 3,574,380 A | * | 4/1971 | Tague | 294/16 |
| 4,364,592 A | | 12/1982 | Jackson | |
| 4,477,113 A | * | 10/1984 | Lybolt | 294/16 |
| 4,740,023 A | * | 4/1988 | Miller | 294/215 |
| 4,955,647 A | | 9/1990 | Alfredson | |
| D651,059 S | | 12/2011 | McDonald | |
| 2007/0046046 A1 | | 3/2007 | Camp | |

\* cited by examiner

*Primary Examiner* — Dean Kramer

(57) ABSTRACT

A log lifting facilitating assembly for includes a first member having a first end and a second end. A spike is attached to the first member adjacent to the first end and is orthogonal to the first member. The spike extends in a first direction relative to the first member. A second member is attached to the second end of the first member and extends in the first direction from the first member further than the spike. A strike plate is attached to the first member. The strike plate is positioned on the first member opposite of the spike. The spike is configured to be driven into an end of a log to facilitate moving of the log.

7 Claims, 2 Drawing Sheets

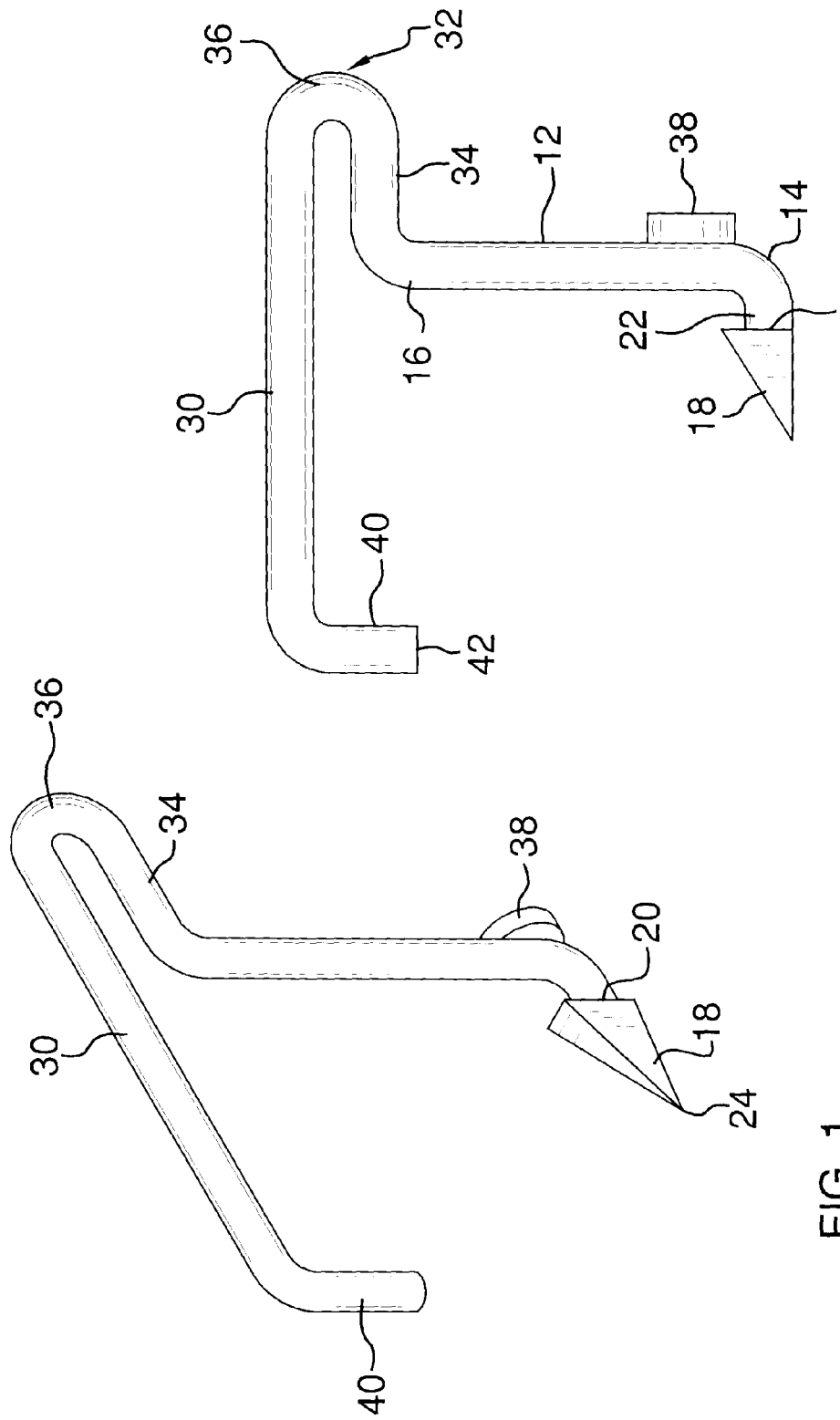

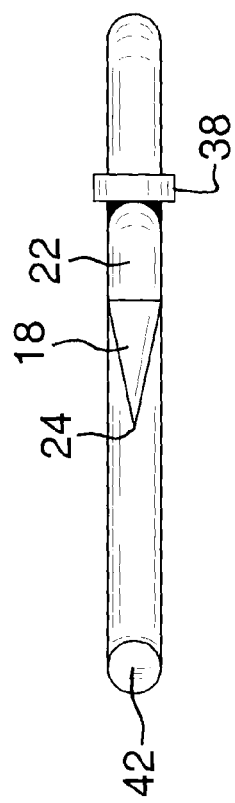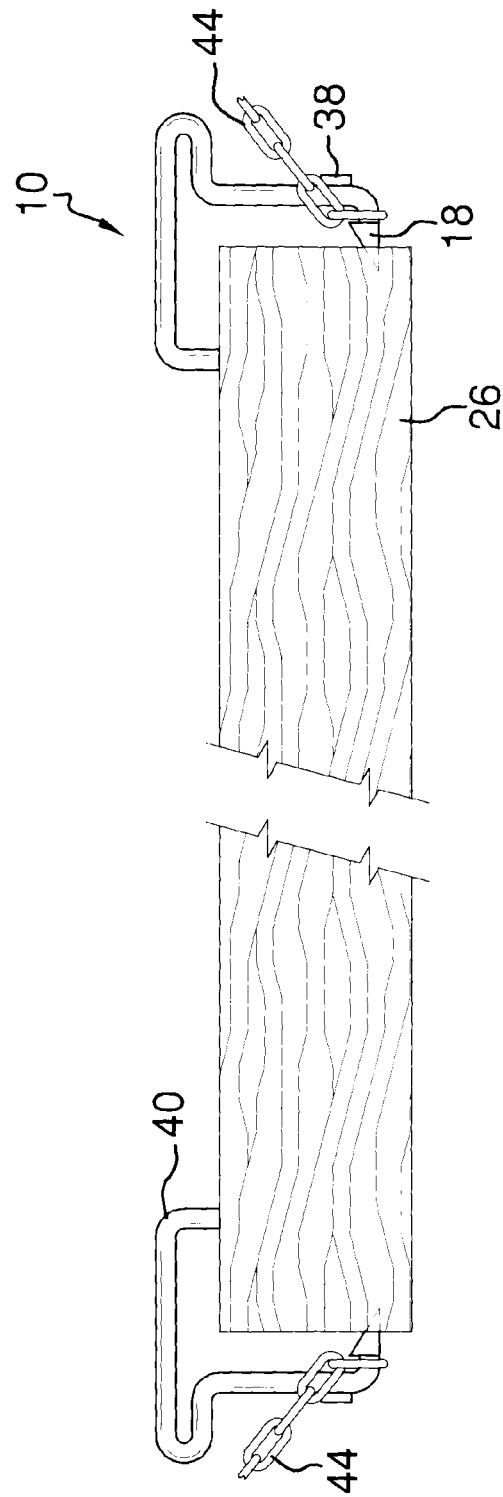

LOG LIFTING FACILITATING ASSEMBLY

BACKGROUND OF THE DISCLOSURE

Field of the Disclosure

The disclosure relates to log lifting devices and more particularly pertains to a new log lifting device for assisting a person in moving and lifting a log or other similar structure.

SUMMARY OF THE DISCLOSURE

An embodiment of the disclosure meets the needs presented above by generally comprising a first member having a first end and a second end. A spike is attached to the first member adjacent to the first end and is orthogonal to the first member. The spike extends in a first direction relative to the first member. A second member is attached to the second end of the first member and extends in the first direction from the first member further than the spike. A strike plate is attached to the first member. The strike plate is positioned on the first member opposite of the spike. The spike is configured to be driven into an end of a log to facilitate moving of the log.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top perspective view of a log lifting facilitating assembly according to an embodiment of the disclosure.

FIG. 2 is a front view of an embodiment of the disclosure.

FIG. 3 is a bottom view of an embodiment of the disclosure.

FIG. 4 is a front in-use view of an embodiment of the disclosure.

DESCRIPTION OF THE PREFERRED EMBODIMENT

With reference now to the drawings, and in particular to FIGS. 1 through 4 thereof, a new log lifting device embodying the principles and concepts of an embodiment of the disclosure and generally designated by the reference numeral 10 will be described.

As best illustrated in FIGS. 1 through 4, the log lifting facilitating assembly 10 generally comprises a first member 12 that has a first end 14 and a second end 16. The first member 12 may generally have a length from the first end 14 to the second end 16 between 4.0 inches and 18.0 inches. A spike 18 is attached to the first member 12 adjacent to the first end 14. The spike 18 extends in a first direction with respect to the first member 12 and is orthogonal to the first member 12. A shoulder 20 is formed between the spike 18 and the first member 12 such that a narrowed portion 22 is defined between first member 12 and free end 24 of the spike 18. The spike 18 terminates in a point for facilitating insertion of the spike 18 into a log 26, wooden plank, wooden stud, or other similar objects.

A second member 30 is attached to the second end 16 of the first member 12. The second member 30 extends in the first direction and a second direction opposite to the first direction. The second member 30 extends in the first direction from the first member 12 a distance further than the spike 18. A spacer 32 is placed between the first 18 and second 30 members to space them from each other. More specifically, the spacer 32 may include a first section 34 attached to the second end 16 and a second section 36 attached to the first section 34. If the first member 12 is vertically oriented with its second end 16 over the first end 14, the first section 34 extends in the second direction and the second section 36 extends upwardly from the first section 34. The second member 30 is attached to the second section 36 and extends in the first direction from the second section 36. While the first 34 and second 36 sections are not required, they facilitate gripping of the assembly 10 as well as counterbalancing the second member 30 as it extends laterally away from the first member 12 in the first direction.

A strike plate 38 is attached to the first member 12. The strike plate 38 is positioned on the first member 12 opposite of the spike 18 and is positioned nearer to the first end 14 than the second end 16. The strike plate 38 is planar and lies in a plane oriented perpendicular to a line extending through the plane of the strike plate 38 and the point, or free end 24, of the spike 18.

A support 40 is attached to the second member 30 opposite of the spacer 32. The support 40 extends in a same direction away from the second member 30 as the first member 12, or downwardly from the second member 30 when the first member 12 is vertically oriented as described above. The support 40 has a terminal end 42 positioned, vertically, between the first end 14 and the second end 16 and nearer to the second end 16. The terminal end 42 is abuttable against the log 26 or other material being lifted to prevent pivotal movement of the spike 18 with respect to the log 26 such that the spike 18 remains in the log 26.

In use, a pair of the assemblies 10 may be used together and inserted into opposite ends of the log 26. The second members 30 may be used as grips for lifting or moving the log 26. Additionally, a chain 44 may be attached to the spike 18 between the shoulder 20 and the first member 18. The chain 44 may be extended between the two assemblies 10. The chain 44, or chains, may be attached to a vehicle or other mechanical lift assembly to lift or drag the log 26 where needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A log movement assisting assembly comprising:
   a first member having a first end and a second end;
   a spike being attached to said first member adjacent to said first end and being orthogonal to said first member, said spike extending in a first direction;
   a second member being attached to said second end of said first member, said second member extending in said first direction from said first member further than said spike;
   a strike plate being attached to said first member, said strike plate being positioned on said first member opposite of said spike;
   wherein said spike is configured to be driven into an end of a log; and
   a shoulder being formed between said spike and said first member, a chain being attached to said spike between said shoulder and said first member.

2. The log movement assembly according to claim 1, further including a spacer being attached to and being positioned between said second member and said second end.

3. The log movement assembly according to claim 2, further including a support being attached to said second member opposite of said spacer, said support extending in a same direction away from said second member as said first member.

4. A log movement assisting assembly comprising:
   a first member having a first end and a second end;
   a spike being attached to said first member adjacent to said first end and being orthogonal to said first member, said spike extending in a first direction;
   a second member being attached to said second end of said first member, said second member extending in said first direction from said first member further than said spike;
   a strike plate being attached to said first member, said strike plate being positioned on said first member opposite of said spike;
   wherein said spike is configured to be driven into an end of a log; and
   wherein said second member further extends in a second direction opposite said first direction.

5. The log movement assembly according to claim 4, further including a spacer being attached to and being positioned between said second member and said second end.

6. The log movement assembly according to claim 5, further including a support being attached to said second member opposite of said spacer, said support extending in a same direction away from said second member as said first member.

7. A log movement assisting assembly comprising:
   a first member having a first end and a second end;
   a spike being attached to said first member adjacent to said first end and being orthogonal to said first member, said spike extending in a first direction, a shoulder being formed between said spike and said first member;
   a second member being attached to said second end of said first member, said second member extending in said first direction and a second direction opposite to said first direction, said second member extending in said first direction from said first member further than said spike;
   a strike plate being attached to said first member, said strike plate being positioned on said first member opposite of said spike;
   a spacer being attached to and being positioned between said second member and said second end;
   a support being attached to said second member opposite of said spacer, said support extending in a same direction away from said second member as said first member;
   a chain being attached to said spike between said shoulder and said first member; and
   wherein said spike is configured to be driven into an end of a log.

* * * * *